3,271,265
FUELS FOR NUCLEAR REACTORS

Peter Murray, Abingdon, and John Brian Sayers, Didcot, England, assignors to United Kingdom Atomic Energy Authority, London, England
No Drawing. Filed May 22, 1964, Ser. No. 369,607
Claims priority, application Great Britain, June 11, 1963, 23,210/63
10 Claims. (Cl. 176—69)

The present invention relates to fuels for nuclear reactors and is more specifically concerned with cermet fuels which are particularly, but not exclusively, suitable for use in water-cooled reactors.

The ideal fuel for use in a water-cooled, e.g. marine, reactor fuel element should possess resistance to swelling at burn-ups equivalent to at least 40,000 mwd./Te(U) in uranium dioxide, have good corrosion resistance to high pressure water in the case of can failure, be capable of being formed into various shapes for fuel elements, be compatible with normal cladding materials and be capable of being, and remaining, bonded to the canning material under conditions of high surface heat flux and stress. At present the fuel for most water-cooled reactors is based on uranium dioxide even though it does not fulfill all the above requirements and such a fuel has been proposed for the reactors known as IBR and Vulcain. If plutonium is used as a fuel material in a water-cooled reactor preliminary reactor physics calculations suggest that a more economic use of the fuel could be made if the plutonium were incorporated in an inert matrix rather than in uranium dioxide, and also the fuel element cross-section should be relatively thin (e.g. less than 0.1 inch).

A suitable cermet fuel in many respects is a stainless steel-$PuO_2$ dispersed fuel, but the stainless steel matrix material has a high neutron capture cross-section and thus, in spite of its other desirable properties, this type of fuel is not feasible.

Substitution of the stainless steel by zirconium or a zirconium alloy as the matrix material removes the difficulty of the high neutron capture cross-section of the matrix material, but reaction between the $PuO_2$ and the zirconium during fabrication of the cermet makes the production of a reproducible cermet very difficult.

It is the object of the present invention to provide a zirconium-based cermet fuel containing plutonium.

According to the present invention there is provided a fuel for a nuclear reactor comprising a dispersion of mixed zirconium and plutonium oxides in an alloy of zirconium forming a matrix material.

It will be appreciated that any of the corrosion-resistant alloys developed for use in pressure water environments can be used for the matrix material but that it is desirable that the alloying additions should not appreciably increase the neutron-capture cross-section of the zirconium. The preferred alloys are those known as "Zircaloys" which have a composition of 0.25–2.5% tin, 0–0.25% iron, 0–0.16% chromium, 0–0.08% nickel, the rest being zirconium except for incidental impurities.

The zirconia renders the plutonium dioxide thermodynamically stable in the presence of the zirconium metal in the alloy. The proportion of zirconia required to render the plutonium dioxide stable is normally provided by a molar ratio zirconia ($ZrO_2$) to plutonium dioxide ($PuO_2$) of greater than one. It should however be appreciated that stability of the plutonium dioxide may be achieved even though the molar ratio of zirconia to plutonium dioxide is less than one.

The irradiation behaviour of the $PuO_2$-$ZrO_2$ mixed oxides is at least as good as that of the undiluted plutonium dioxide.

The fuel may have a wide range of composition, since variations in the composition of the mixed oxide ceramic particles and in the proportion of ceramic particles in the matrix are both possible.

Variations in the composition of the ceramic material merely have to satisfy the condition of thermodynamic stability, e.g. such that the molar ratio of zirconia to plutonium dioxide is greater than unity.

A ceramic content of up to 40 volume percent is possible and thus plutonium concentrations of up to 1 gm./cc. are possible in the cermet. This concentration may be higher than is needed and thus dilution of the plutonium oxide with a fertile metal oxide, for example oxides of $Th^{232}$ or $U^{238}$ is possible and may be considered advantageous for the production of a long fuel lifetime. Such dilution gives a three component ceramic content and in this both the plutonium dioxide and the added fertile metal oxide require stabilisation by the zirconia.

A fuel element according to the invention may be made to possess a number of advantageous features of which a potential fuel burn-up of the order of $20 \times 10^{20}$ fissions/cc. may be considered the most important. Another important property possessed by such a fuel element material is good corrosion resistance, this being particularly desirable in reactors such as IBR or Vulcain where long fuel lifetimes are essential and single defected or failed elements cannot be discharged separately. The cladding of a plutonium dioxide-zirconia-zirconium alloy fuel may very conveniently be the same alloy as the matrix material and thus the fuel may be readily metallurgically bonded to the cladding. A further desirable feature of a plutonium dioxide-zirconia-zirconium alloy cermet is that it may be fabricated to the desired form relatively easily.

The fabrication of the fuel element may be divided into three distinct stages, these being: preparation of spheroids of the mixed oxides, distributing the spheroids uniformly in a matrix of the zirconium alloy and fabricating the fuel element from the cermet. Each of these stages may be effected using known techniques.

The spheroids of mixed oxide may be prepared by mixing the oxides together, ball-milling the mixed oxides, adding binder, lightly pressing to form a compact, granulating the compact, spheroidising the granules and sintering the spheroids. The granules are preferably spheroidised using a vibrating table or trough having a smooth surface. Alternatively, the pressing step may be omitted and the granules produced by mixing together the mixed oxide and the binder and subsequently granulating through a sieve. The granules thus obtained are then preferably spheroidised in a planetary mill.

Using the first of these alternative mixing and spheroidisation processes, the preferred binders are stearic acid or aluminium stearate, no solvent being used for either of these two binders. If the second alternative process is used it is preferred to use n-decanol as a binder.

Sintering in either case is effected in a mildly reducing atmosphere and the preferred atmosphere is hydrogen which has been saturated with water vapour at room temperature by bubbling the gas through water. The sintering temperature using such an atmosphere is 1550° C. Other atmospheres could be used for the sintering, for example a mixture of carbon monoxide and carbon dioxide, but these would produce a sintered body having a density reduced compared with the density of a body sintered in wet hydrogen.

A third alternative procedure which may be used for obtaining the spheroids comprises mixing the oxides, ball milling, pressing, granulating and spheroidising in a plasma jet. It will be observed that this procedure does not require the use of a binder and that the granules will undergo at least partial fusion in the plasma in forming the spheroids and thus no sintering is required.

The spheroids produced by any of the foregoing processes may then be treated to coat them with the zirconium alloy. The coating may be accomplished by tumbling the spheroids in a drum and spraying in sufficient of the powered alloy in a suspension to give the appropriate volume fraction or, alternatively, a binder may be added to the spheroids which are then mixed with an excess of the zirconium alloy powder. The coated spheroids obtained by either of these processes are then pressed to form a cermet compact.

The cermet compact may then be fabricated into fuel elements by cladding the compact with a suitable metal, which is desirably the zirconium alloy used to coat the spheroids. The fabrication of the fuel elements may be effected by picture-frame rolling to give plates, by swaging to give rods or by a pressing procedure, for example hot isostatic pressing, in which case rods, plates or complex shapes could be obtained as desired.

An example of the fabrication of a small fuel element containing the fuel material of the present invention will now be described by way of example.

Example 100 gms. of calcined plutonium dioxide of particle size less than 2 microns and 50 gms. of zirconium dioxide of particle size less than 400 mesh B.S.S. (i.e. less than 37 microns) were placed in a rubber-lined ball mill and dry milled for 12 hours using alumina balls.

The mixed oxide was then transferred to a bowl and 5 grammes of n-decanol was added to the mixed oxide which was then hand-mixed for 10 minutes to obtain a uniform distribution of the binder.

The mix was then pushed through a sieve to give granules of the order of 200–300 microns (or between 72 mesh and 52 mesh).

The granules were then introduced into a planetary mill and gyrated for 30 minutes with occasional additions of dry mix to obtain spheroids of mixed plutonium dioxide-zirconium dioxide.

The spheroids were then placed in an alumina crucible and sintered by heating in a furnace under a flowing atmosphere of hydrogen which had been saturated with water at room temperature. The sintering temperature was 1550° C. and was maintained for 4 hours.

The sintered spheroids were allowed to cool and then placed in a horizontal drum. The drum was heated to about 100° C. and rotated at 100 r.p.m. (giving a surface speed of about 120 feet per second) to tumble the spheroids. The spheroids were tumbled for 30 minutes to allow them to attain the equilibrium temperature of the drum and a suspension of zircaloy powder of size smaller than 200 mesh B.S.S. (i.e. less than 76 microns) in acetone containing 3% by volume of binder was sprayed into the drum in a quantity sufficient to give a volume fraction of ceramic content of 30%. The binder used was a mixture of polybutylmethocrylate and dibutylphthalate in a ketone solvent sold under the name Cranco.

When sufficient zircaloy had been added to the mixed oxide spheroids, the coated spheroids were removed from the drum and pressed at 25 tons/sq. in to give a cermet compact 1.0 inch x 0.5 inch x 0.2 inch thick.

The cermet compact was then clad between sheets of zircaloy of size 1.25 inches by 0.75 inch and thickness 0.050 inch and rolled using a picture-frame rolling technique. The middle zircaloy sheet was a rectangular annulus of width 0.125 inch. The plates obtained by cladding the particles between the zircaloy sheets were rolled at a temperature of 750° C. to reduce their thickness from 0.3 to 0.1 inch, and to give plates of size 3.75 inches by 0.75 inch.

It will be appreciated that all these operations are effected in a glove box or similar enclosure.

We claim:

1. A fuel material for a nuclear reactor comprising a dispersion of mixed zirconium and plutonium dioxides in a matrix formed of a zirconium-based alloy having a low neutron-capture cross section rendering said alloy suitable for use as a matrix for reactor fuel.

2. A fuel material according to claim 1 wherein the alloy is a pressurized water corrosion resistant alloy.

3. A fuel material for a nuclear reactor comprising a dispersion of mixed zirconium and plutonium dioxides in a matrix formed of a zirconium-based alloy having a composition of 0.25–2.5% tin, 0–0.25% iron, 0–0.16% chromium, 0–0.08% nickel, the rest being zirconium except for incidental impurities.

4. The fuel material of claim 3 in which the molar ratio of zirconium dioxide to plutonium dioxide is greater than one.

5. The fuel material of claim 3 in which the mixed oxides form up to 40% by volume of the material.

6. The fuel material of claim 5 in which the mixed oxides form 30% by volume of the material.

7. A fuel material for a nuclear reactor comprising a dispersion of a mixture of zirconium dioxide, plutonium dioxide and a fertile metal oxide in a matrix formed of a zirconium-based alloy having a low neutron-capture cross section rendering said alloy suitable for use as a matrix for reactor fuel.

8. The fuel material of claim 7 in which the fertile metal oxide is selected from the group consisting of the dioxides of $Th^{232}$ and $U^{238}$.

9. A fuel element for a nuclear reactor comprising a fuel material in a cladding material in which the fuel material comprises a dispersion of mixed zirconium and plutonium dioxides in a matrix formed of a pressurized water corrosion resistant zirconium-based alloy having a low neutron-capture cross section rendering said alloy suitable for use as a matrix for reactor fuel and the cladding material is the same zirconium-based alloy as the matrix.

10. The fuel of claim 1 in which the zirconium-based alloy is a tin-containing alloy having a high resistance to corrosion by pressurized water.

No references cited.

BENJAMIN R. PADGETT, *Acting Primary Examiner.*
L. DEWAYNE RUTLEDGE, REUBEN EPSTEIN,
*Examiners.*
J. V. MAY, M. J. SCOLNICK, *Assistant Examiners.*